Sept. 24, 1963     F. GASCHE     3,104,583

SCREW CONNECTION HAVING COIL SPRING THREAD MEANS

Filed Oct. 31, 1960

INVENTOR.
Fred Gasche
BY Ralph Hanson
Attorney

United States Patent Office 3,104,583
Patented Sept. 24, 1963

3,104,583
SCREW CONNECTION HAVING COIL SPRING THREAD MEANS
Fred Gasche, Erie, Pa., assignor to Autoclave Engineers, Inc., Erie, Pa., a corporation of Pennsylvania
Filed Oct. 31, 1960, Ser. No. 66,272
1 Claim. (Cl. 85—46)

This invention is a screw connection in a preferred form of which the parts to be connected have opposed internal and external helical grooves of arcuate cross section and the screw thread comprises a length of coil spring in which the diameter of the individual coils of the spring matches the diameter of the grooves. This screw connection has exceptional strength because of the absence of sharp corners at the roots of the grooves.

Figure 1:
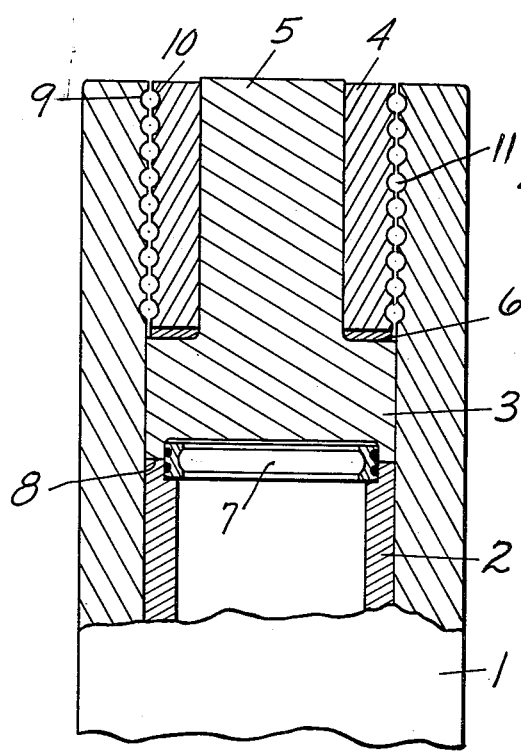
Figure 4:
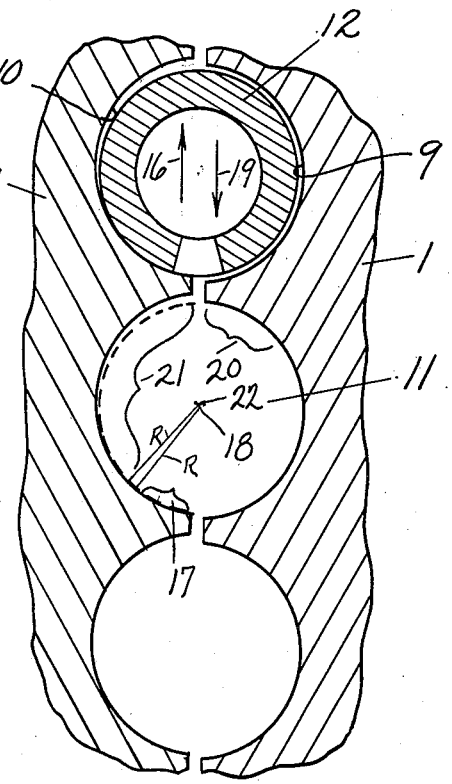
Figure 2:
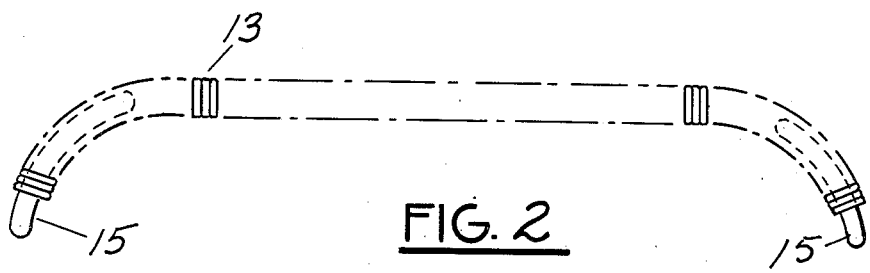
Figure 3:
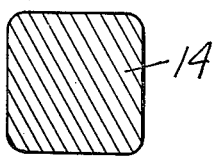

In the drawing, FIG. 1 is a longitudinal section through a screw connection, FIG. 2 is a view of the length of coil spring forming the screw thread, FIG. 3 is an enlarged cross section of the wire of the coil spring, and FIG. 4 is an enlarged fragmentary section in a radial plane through the axis of the thread and through the center of one of the coils of the spring showing the action of the thread under load.

The screw connection is shown applied to a pressure vessel in which the common parts are readily identified, 1 being the body, 2 the liner, and 3 the cover held in place by a nut 4 surrounding a reduced section 5 at the center of the cover. A thrust washer 6 is arranged between the nut and the cover. There is a seal 7 for the butt joint 8 between the cover and liner. At the end of each run, access to the contents of the pressure vessel is obtained by unscrewing the nut 4 and removing the cover. This may have to be done frequently and, for this purpose, an easily manipulated screw connection is desired. At the same time, the screw connection must have sufficient strength to withstand the operating pressure of the vessel with the desired factor of safety.

For this purpose, the telescoping surfaces of body 1 and nut 4 are provided respectively with opposed internal and external helical grooves 9 and 10. As shown more clearly in FIG. 4, the grooves 9 and 10 cooperate to define a helical way 11 of circular or other suitable cross section having an inside diameter slightly greater than the outside diameter of the individual coils 12 of a length 13 of coil spring which acts as the screw thread. The coil spring is preferably wound of wire 14 of rectangular cross section as shown in FIG. 3 with the adjacent coils in contiguous relation. The coil spring 13 is conveniently made in lengths which are easy to handle. In accordance with one method of assembly, the coil spring is inserted in the internal groove 9. The inherent resilience of the coil spring exerts an outward pressure tending to hold the spring against the bottoms of the grooves 9. At opposite ends of the spring are curved inserts 15 of the same radius of curvature as the groove 9 which compel the ends of the spring to conform to the grooves. These inserts are needed only at the ends of the spring. The inserts need not be fastened to the grooves 9 because the inherent resilience of the spring tends to hold them in place. The curvature of the inserts corresponds to the pitch diameter of the threaded connection. The same spring 13 may be used for screw connections of different pitch diameters. When this is done, the inserts 15 are changed to correspond to the desired pitch diameter. It is not necessary that the spring 13 extend the full length of the helical way 11. Several springs 13 of easily handled lengths may be arranged in end to end relation to provide the desired length of screw thread. Instead of assembling the spring in the internal groove 9, the spring may be wrapped around the external groove 10. When this is done, the inserts 15 must be fastened into the groove because the tension of spring 13 tends to move the inserts out of the groove 10.

After assembly of the coil springs in the internal grooves 9, the body in effect has a screw thread which consists of the projecting portions of the coil spring. The nut 4 may be screwed and unscrewed in the conventional manner. Conveniently there is sufficient clearance between the spring 13 and the groove 10 so that the nut is easily screwed and unscrewed. This clearance is preferably provided on non load bearing surfaces. Under pressure, the load on nut 4 is in the direction of arrow 16 and is taken on arcuate surface 17 of radius "$r$" about center 18 on the pitch diameter of the thread. Similarly the load on the body 1 is in the direction of arrow 19 and is taken on arcuate surface 20 of radius "$r$" about center 18. The arcuate surfaces 17 and 20 have radii matching the radius of the outside diameter of the coils 12 of the coil spring 13. The clearance on the non load bearing surface 21 of the groove 10 is conveniently obtained by forming this part of the groove of radius "$r$" about center 22. The surfaces 17 and 20 need not be truly circular but may conform to the shape the coils assume under load.

The screw connection has surprising strength. The roots of the grooves 9 and 10 are of large radius and are inherently stronger than conventional cut threads which are always weakest at the roots. The load on the individual turns 12 of the coil spring 13 is taken primarily in shear in the direction of arrows 16 and 19 and the strength of the individual coils in this direction is very great. If the elastic limit of the coils 12 of the spring is exceeded, the coils may be deformed but even when the takes place, the nut can still be screwed and unscrewed with comparative ease. The deformation of the individual coils of the coil springs 13 does not damage the grooves 9 and 10. The damaged coil springs 13 are relatively inexpensive and easily replaced.

The coil springs 13 are much easier to handle than helical coils of solid wire of the diameter of the way 11. The coil springs are flexible and readily adapt themselves to the pitch diameter of the grooves. The load is uniformly divided between the individual threads.

In pressure vessels where temperatures and pressures are high, with conventional threads it has heretofore been necessary to make the nut 4 and body 1 of different materials in order to prevent galling of the threads. This has introduced thermal expansion problems resulting from dissimilar materials. The stresses set up by differences in thermal expansion cause progressive deformation of structures with conventional threads, such as belling or flaring of the body. This cannot take place with the present thread. The clearance between the nut and body is large enough to eliminate direct contact. The spring has resilience or flexibility preventing over stress of the nut and body. If the spring is over stressed, it is easily replaced. The choice of materials for the nut and body is not limited by thermal expansion or by thread galling. Both of these problems are eliminated. The body and nut can be of the same material or of different materials as desired.

The particular thread illustrated in FIG. 4 had a pitch diameter of 9¼ inches, the pitch between the grooves 9, 10 was ⅔ inch and the radius "$r$" of the groove was ¼ inch.

What is claimed as new is:

A screw connection comprising cylindrical inner and outer telescoping bodies having a common axis with the telescoping surfaces having a clearance therebetween, the telescoping surface of the inner body having an external helical groove and with the telescoping surface of the outer body having an internal helical groove, said grooves being opposed and defining a helical way of a plurality of turns of circular cross section, and a coil spring having a plurality of contiguous individual coils of slightly smaller diameter than said cross section, said spring itself coiled in a helix of a plurality of turns, said helical way having a pitch greater than the diameter of the contiguous individual coils of the spring, said coil spring being situated in and extending along said way and with the contiguous individual coils of the spring in the cross section of said way thereby providing a screw thread connection of a plurality of turns between said bodies, the radius of said contiguous individual coils substantially exceeding the thickness of the wire which forms each said coil to provide a circular space within the contiguous individual coils which allows the individual coils of the spring to partially collapse and thereby distribute the stress.

References Cited in the file of this patent

UNITED STATES PATENTS

| | | |
|---|---|---|
| 1,489,809 | Austin | Apr. 8, 1924 |
| 2,150,875 | Caminez | Mar. 14, 1939 |
| 2,341,670 | Stinson | Feb. 15, 1944 |
| 2,418,418 | Martin et al. | Apr. 1, 1947 |
| 2,458,714 | Mahoney | Jan. 11, 1949 |
| 2,848,135 | Rickard et al. | Aug. 19, 1958 |
| 2,922,665 | Beyer | Jan. 26, 1960 |

FOREIGN PATENTS

| | | |
|---|---|---|
| 803,517 | France | Oct. 2, 1938 |
| 946,580 | Germany | July 12, 1956 |